Oct. 28, 1969 L. F. BUDDS ET AL 3,475,587
OPPOSED ARC WELDING
Filed June 28, 1966 2 Sheets-Sheet 1

INVENTORS
LEE F. BUDDS
MICHAEL PERRY
BY Thomas S. MacDonald
ATTORNEY

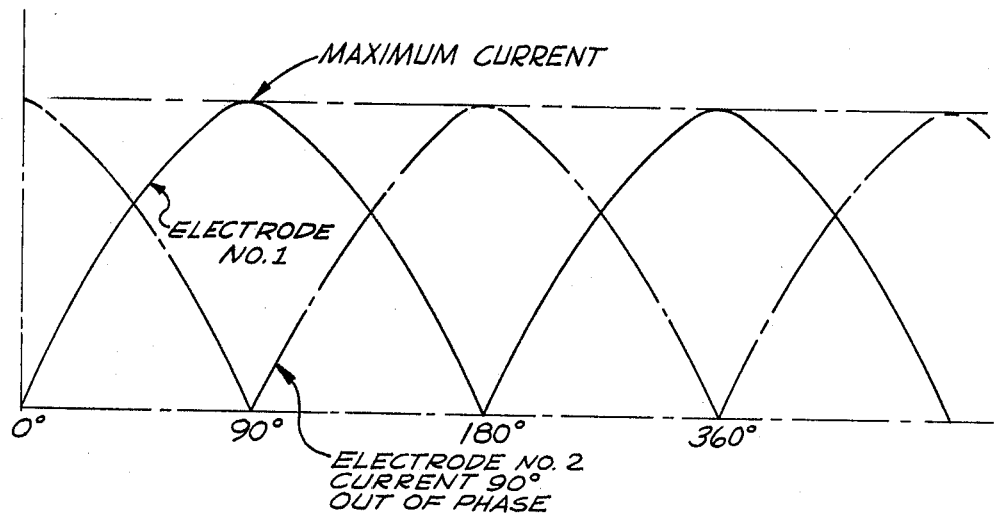
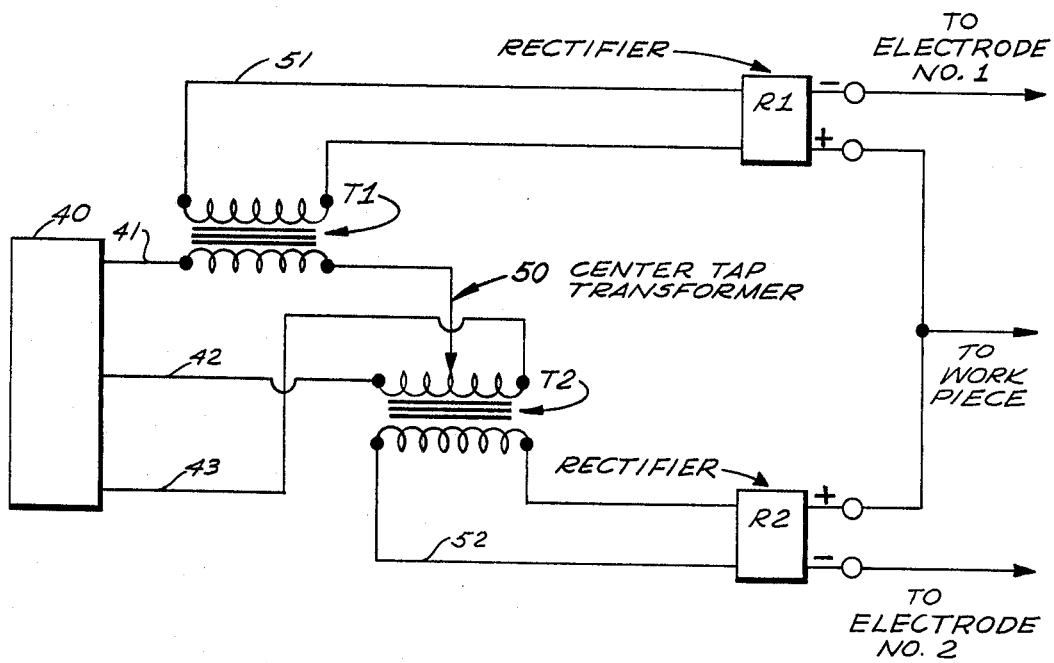

United States Patent Office 3,475,587
Patented Oct. 28, 1969

3,475,587
OPPOSED ARC WELDING
Lee F. Budds, Canoga Park, Calif., and Michael Perry, Ledyard, Conn., assignors to North American Rockwell Corporation, a corporation of Delaware
Filed June 28, 1966, Ser. No. 561,240
Int. Cl. B23k 9/00
U.S. Cl. 219—137                                                                                1 Claim

ABSTRACT OF THE DISCLOSURE

A welding apparatus having offset, tilted opposed welding heads placed on opposite sides of a butt joint to form a weld by supplying a DC current 90° out-of-phase to each of said welding heads thereby preventing the magnetic repulsion phenomena normally associated with in-phase welders. The apparatus makes a narrower weld bead having an hourglass shaped cross-section at a reduced current from that normally associated with state-of-the-art welders.

---

This invention relates to welding devices and more specifically to opposed welding devices of the inert gas arc welding type.

The invention described herein was made in the performance of work under a NASA contract and is subject to the provisions of Section 305 of the National Aeronautics and Space Act of 1958, Public Law 85–268 (72 Stat. 435; 42 USC 2457).

Conventional prior art butt welding techniques which make use of pairs of arc welding devices have encountered numerous obstacles which serve to render the resulting weld nugget expensive to form and often of defective quality. Generally, the butt weld joint is used to join adjacent edges of coplanar metal plates. Present day techniques fail to produce weld joints meeting the minimum standards of tensile and ductility values required, for example, by the exacting standards for rocket and missile components. The ideal weld nugget should be as narrow as possible and of symmetrical hourglass shape in order that there be a balanced shrinkage stress and minimal distortion.

The chief reason why conventional arc welding devices produce poor quality weld nuggets and hence defective weld joints is that the opposing arcs generate a field of magnetic repulsion in the weld puddles. Weld puddles are the molten metal masses. These puddles are caused to merge into a unitary mass prior to formation of the final nugget shape. Magnetic repulsion serves to increase (1) the perplexities of thermal variation characterized by irregular heating in the heat effected zone, (2) the expenditure of electrical energy required to form the joint, and (3) the metal spill-out rate which is the amount of molten metal that escapes and becomes wasted during welding. The occurrence of metal spill-out is burdensome because such metal often must be replaced by filler material.

The instant invention overcomes the above mentioned obstacles and deficiencies of the prior arc welding devices by eliminating the magnetic repulsion effect. This is accomplished by supplying conventional weld heads facing one another in spaced relationship on opposing sides of a butt joint with 90° out of phase electrical current, preferably rectified DC current. That is, the current passing through the electrode of one weld head is 90° out of phase with the current passing through the electrode of the opposed weld head and vice versa. By this inventive arrangement, much deeper penetration in less time is achieved and the width of the weld bead is much narrower.

One object of the instant invention is to provide a butt welding arrangement capable of expeditiously forming symmetrical hourglass shaped nuggets with a minimal amount of shrinkage and distortion.

Another object of this invention is to provide an arc welding arrangement capable of producing narrow weld beads associated with the weld nugget formed by a single welding pass.

A further object of this invention is to provide an arc welding arrangement capable of much improved digging action characterized by an increased rate of penetration without accompanying excessive undercut, concavity, and metal spill-out.

Another object of the instant invention is to provide an opposed arc welding arrangement capable of producing deeper butt joints in metals ordinarily very difficult to weld requiring no filler material.

Briefly stated, the instant invention is a welding arrangement having twin welding devices with their weld heads adjacent the opposing faces of the metal materials to be butt welded. For example such an arrangement could include tungsten inert gas arc welders. AC current is transmitted through an electrical circuit including a center tap transformer that shifts the current to be passed to the weld heads into a 90° out of phase relationship. Preferably the circuit includes a pair of full wave rectifiers for converting the AC current into DC current. By this arrangement when welding is commenced a butt joint is formed quickly and perfectly in a manner previously unobtainable because of the unexpected elimination of the magnetic repulsion phenomenon generated by conventional arc welding arrangements.

The foregoing, as well as other objects of this invention, will become apparent from the following description considered in connection with the accompanying drawings in which:

FIG. 4 is a diagram of the electrical circuit used to supply current to the twin welding heads.

FIG. 5 shows single phase current curves for the 90° out of phase current supplied to the weld heads.

Figure 1:
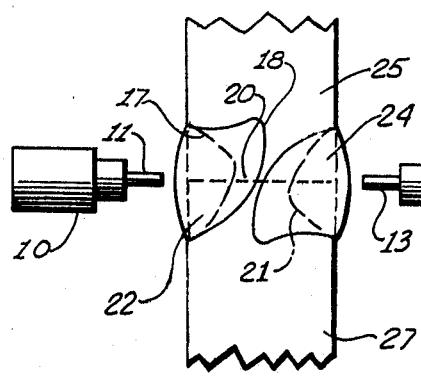
FIG. 1 is a vertical, cross-sectional schematic view showing conventional twin welding heads making an imperfect weld nugget.

The uniqueness and advantages of the instant invention can be understood by first, for purposes of comparison, described the operation and deficiencies of a conventional twin arc welding arrangement. Referring to FIG. 1 there is shown schematically a pair of typical weld heads 10 and 12 for a pair of conventional tungsten inert gas arc welding devices (not shown). Weld heads 10 and 12 are equipped with electrodes 11 and 13 respectively preferably fabricated from tungsten because of its relatively high melting point. It is well known in the art that coalescence or melting of the metal to be welded is produced by the localized heating from electric arcs struck between the metal electrodes and the workpiece. Ordinarily, a suitable inert gas such as argon or helium or a mixture thereof issues from a collar (not shown) surrounding the electrode to form a protective shield and to prevent the resulting molten metal from becoming contaminated. Metal plates 25 and 27 are positioned in superposed relationship and define an interface or juncture 20 shown in dotted line representing the center line of the weld nugget to be formed.

One of the major defects in the weld nugget formed by using this type of apparatus is caused by the phenomenon known as magnetic repulsion. Formation of the weld nugget progresses very slowly with an accompanying high metal spill-out rate necessitating the use of metal filler material. More important, magnetic repulsion produces distortion in the weld nugget often to such an extreme degree that the nugget is unacceptable.

Magnetic repulsion is due to the mode in which electrical power is supplied to electrodes 11 and 13. Under customary straight polarity principles, electrodes 11 and 13 would be electrically connected with the negative electrode of a weld power supply source (not shown). The workpiece constituted by parts 25 and 27 would be connected to the positive electrode of the weld power supply source. In-phase electrical current, either AC or DC, would be supplied to electrodes 11 and 13. The respective arcs from the electrodes would penetrate into juncture 20 forming molten weld puddles 22 and 24. The puddles are depicted in their early development stages by phantom lines 17 and 21 in FIG. 1. Magnetic repulsion exists in the molten puddles at all times and its intensity is inversely proportional to the square of the distance between puddles 22 and 24. Magnetic repulsion is characterized by electrical force fields which are coterminous with the contouring of the puddles. The force fields are of identical electrical properties and oppose one another. The force fields in essence behave like magnets of the same polarity being drawn toward one another. The resistance becomes very intense as the individual force fields associated with puddles 22 and 24 draw closer and at some penetration point the leading edges of the contours start to hook away from one another. As penetration into juncture 20 by the weld puddles increases, the hooking action becomes more pronounced as depicted by the solid lines 18 and 22 in FIG. 1. The presence of the electrical fields induce the puddles to seek paths of least resistance. When puddles 22 and 24 finally merge (this stage is not depicted) the resulting weld nugget is misshaped. A perfect weld nugget is characterized by a symmetrical hourglass shape. Thus the identical pulsing of electrical current to electrodes 11 and 13 generates a field of magnetic repulsion that produces defective weld nuggets.

The above-described misshaped weld nuggets are unacceptable in many fields of manufacturing. For example, the defense industries must satisfy high quality standards in constructing components to be incorporated in rockets and missiles. When fabrication of these components requires welding, utilization of present day twin arc welding techniques, as outlined above, is costly in both man hours and materials used due to the high reject rate. In addition, increased quantities of electrical energy are expended due to the fact that in conventional welding arrangements, magnetic repulsion is present.

Figure 2:
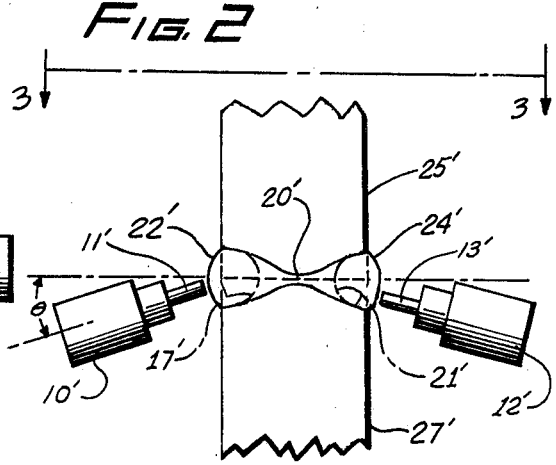
FIG. 2 is a view similar to that of FIG. 1, showing twin welding heads of the instant invention making a perfect weld nugget.
Figure 3:
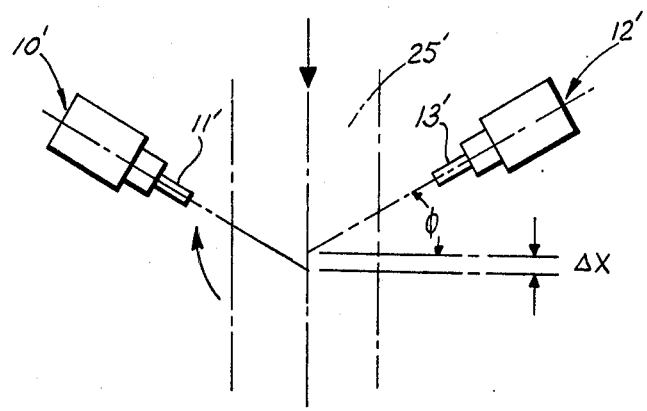
FIG. 3 is a top view taken along line 3—3 shown in FIG. 2.

The instant invention avoids the defects inherent in prior art twin welding arrangements by eliminating or severely diminishing magnetic repulsion. Referring to FIG. 2, a pair of weld heads 10' and 12' are shown on opposing faces of plates 25' and 27'. The plates are arranged in abutting relationship so that the interface or juncture 20' between them can be butt welded. Although not critical to the instant invention, it is of benefit, as shown in FIG. 2, to slightly tilt weld heads 10' and 12' upwardly by an angle $\theta$ in the order of 2 to 5 degrees. By this alignment, when the line of weld formation is approximately horizontal, the fluid forces of the issuing inert gas streams can be used to maintain weld puddles 22' and 24' in place and thus prevent metal from the weld puddles from spilling out. The advantage by so inclining weld heads 10' and 12' would not be obtained if the line of weld formation was aligned other than approximately horizontal. As shown in FIG. 3, which is a top view of the welding arrangement, plates 25' and 27' are moved during welding in the direction indicated by the arrow and between the weld heads which are kept stationary. In the alternative, the weld heads could be moved relative to stationary plates. Weld heads 10' and 12' are slightly offset or staggered from one another, in the horizontal plane, by a sufficient distance $\Delta X$ preferably in the order of one-eighth of an inch. Weld heads 10' and 12' are each inclined through an angle $\phi$ in the order of 2 to 10 degrees to the opposing faces of metal plates 25' and 27'. The advantage of inclining the weld heads at an angle $\phi$, relative to a vertical plane oriented perpendicularly to the axis of movement, is the promotion of superior digging action into juncture 20. Weld puddles 22' and 24' will be pushed and blown forwardly and prevented from interfering with formations of new molten masses. The staggered orientation of weld heads 10' and 12' tends to minimize the risk of blow-outs and explosions near the merging point of the weld puddles caused by intersecting arcs. By preventing direct clash between opposed arcs there is less opportunity for metal spill-out. The weld puddles 22' and 24' are finally caused to merge and quickly solidify a slight distance ahead of the arcs to form a continuous hourglass shaped weld nugget depicted in solid line (FIG. 2).

How magnetic repulsion is eliminated or severely minimized will now be explained in detail. Formation of weld puddles 22' and 24' in their early stages is depicted by the phantom lines 17' and 21' in FIG. 2. Electrical current preferably rectified DC current, is pulsed to electrodes 11' and 13' in 90° out-of-phase relationship. AC current could also be used. Although electrical force fields in individual puddles 22' and 24' exist, they do not oppose one another. When the force field is most intense in one puddle, it is least intense in the other puddle. As a consequence, the force fields are unable to generate a high intensity of magnetic repulsion. The puddles are formed along paths indicated by the directions in which the arcs are penetrated. The leading edges of the weld puddles, as depicted in solid lines in FIG. 2, merge to complete a symmetrical hourglass shaped weld nugget. The bead thickness of the resulting weld nugget is narrower than the bead thickness, shown in FIG. 1, obtainable by conventional welding arrangements. This also results from the fact that magnetic repulsion is eliminated.

Common metals and alloys such as aluminum, stainless steel, Inconel and the like can be welded by the technique of the instant invention. However, it is especially outstanding in making butt joints up to one inch in thickness in plates constructed of metals such as titanium, molybdenum, columbium, tantalum and tungsten. These latter metals are generally troublesome to weld due to their high melting point.

An electrical power circuit for energizing electrodes 11' and 13' is shown in FIG. 5. A conventional three phase AC current power source 40 is the welding power supply. It can be equipped with standard components for varying current, voltage, and inductance. These electrical properties may be varied to suit welding requirement characteristics. AC current is transmitted through lines 41, 42, and 43 to a pair of conventional transformers $T_1$ and $T_2$. The most important aspect of the instant invention is shifting the currents to be used in electrodes 11' and 13' into 90° out-of-phase relationship. This is accomplished by wiring transformers $T_1$ and $T_2$ together by way of a center tap transformer 50. The current transmitted through lines 51 and 52 will be 90° out-of-phase. Devices other than a center tap transformer can effect the same result. For example, a single motor driving two AC alternators, operated 90° phase shifted from one another, could be utilized. Preferably the 90° out-of-phase current is passed through rectifiers $R_1$ and $R_2$. DC current is transmitted from the negative terminal of rectifier $R_1$ to one weld electrode and DC current is transmitted from the negative terminal of $R_2$ to the second weld electrode. Lead lines from the positive terminals of rectifiers $R_1$ and $R_2$ are wired together and grounded to the workpiece to be welded such as plates 25' and 27'.

Superimposed curves of the full wave rectified current passing to welding electrodes are shown in FIG. 6. The curve of electrode No. 1 representing weld electrode 11' and the curve of electrode No. 2 representing weld electrode 13' are shown in solid and dot-dash lines respectively. At 0° when the current intensity in electrode No. 1 is zero the current intensity in electrode No. 2 is maximum. Between 0° and 90° the current intensities of electrodes 1 and 2 are increasing and collapsing respectively. At 90° the current intensity from electrode 1 is maximum while the current intensity from electrode 2 is zero. Between 90° and 180° the current intensities in electrodes 1 and 2 are collapsing and increasing respectively. This cycle is continuous. For a conventional twin welding arrangement, the current pulsed to the electrodes would be equivalent at all times and would operate to generate a field of magnetic repulsion.

Due to the fact that current pulsed to eltctrodes 11' and 13' is 90° out-of-phase at all times, magnetic repulsion is neutralized or at least minimized. The weld pulses interlace causing the rising pulse in one electrode to climax while the opposing weld electrode is at zero pulse. The individual electrical force fields associated with weld puddles 22' and 24' are compatible so that formation of the weld nugget is greatly facilitated and achieved in a time shorter than ever before attained by a twin welding arrangement. By eliminating equivalent polarity in the opposing electrodes, as exists in conventional arrangements, penetration also is much improved.

While the invention has been described in terms of supplying rectified DC current to the weld electrodes, AC current could also be used. In addition, although the inventive welding arrangement has been described as utilizing welding heads of the tungsten inert gas arc welding type, other types of welding devices could be used such as metallic inert gas, and ordinary or stick arc welding which does not utilize an inert gas. It is unimportant in the instant invention whether or not filler material is added during the welding process.

Although the invention has been described and illustrated in detail, it is to be understood that the same is by way of illustration and example only and is not to be taken by way of limitation, the spirit and scope of this invention being limited only by the terms of the appended claim.

We claim:

1. Welding apparatus for butt welding a pair of metal plates comprising;
   a pair of arc welding devices having opposed weld electrodes adapted to be positioned adjacent opposite side of the plates to be butt welded,
   both of said weld electrodes being tilted 2° to 5° from the vertical side of the vertical plane containing the seam to be butt welded and slanted from 2° to 10° rearwardly of a vertical plane at right angles to said butted seam so as to form an obtuse angle to the line of movement of said electrodes along said seam, said electrodes being offset from one another along said seam a distance of the order of one-eighth of an inch, and,
   means including an electrical circuit, for supplying 90° out-of-phase electrical current to the respective opposed weld electrodes, so that during welding the effects of magnetic repulsion in the molten weld are relieved and the resultant weld is of a symmetrical hourglass shape.

References Cited
UNITED STATES PATENTS

| | | | |
|---|---|---|---|
| 2,583,507 | 1/1952 | Carpenter et al. | 219—131 |
| 2,653,277 | 9/1953 | Pickering | 219—131 X |
| 2,667,559 | 1/1954 | Arnold | 219—137 |
| 3,223,816 | 12/1965 | Marsden | 219—137 X |
| 3,319,043 | 5/1967 | Rohrberg | 219—137 |

JOSEPH V. TRUHE, Primary Examiner

J. G. SMITH, Assistant Examiner